United States Patent
Sugaya

(10) Patent No.: US 11,792,495 B2
(45) Date of Patent: Oct. 17, 2023

(54) IMAGING APPARATUS

(71) Applicant: CANON KABUSHIKI KAISHA, Tokyo (JP)

(72) Inventor: Kazuki Sugaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 17/716,690

(22) Filed: Apr. 8, 2022

(65) Prior Publication Data
US 2022/0329713 A1 Oct. 13, 2022

(30) Foreign Application Priority Data

Apr. 13, 2021 (JP) ................................. 2021-067634

(51) Int. Cl.
| | | |
|---|---|---|
| H04N 23/52 | (2023.01) | |
| G03B 17/55 | (2021.01) | |
| H04N 23/54 | (2023.01) | |
| H04N 23/68 | (2023.01) | |

(52) U.S. Cl.
CPC ............ *H04N 23/52* (2023.01); *G03B 17/55* (2013.01); *H04N 23/54* (2023.01); *H04N 23/687* (2023.01)

(58) Field of Classification Search
CPC ...... H04N 23/52; H04N 23/54; H04N 23/687; G03B 17/55
See application file for complete search history.

(56) References Cited

U.S. PATENT DOCUMENTS

| | | | | |
|---|---|---|---|---|
| 2009/0002549 A1* | 1/2009 | Kobayashi | ............. | H04N 23/52 348/374 |
| 2009/0051774 A1* | 2/2009 | Shiraishi | ................ | H04N 23/57 348/207.99 |
| 2016/0148856 A1* | 5/2016 | Morino | ................... | H01L 24/40 257/694 |
| 2018/0107099 A1* | 4/2018 | Yasuda | .................. | G03B 17/55 |
| 2020/0120251 A1* | 4/2020 | Toda | ..................... | H04N 23/50 |
| 2021/0289110 A1* | 9/2021 | Ogawa | ................... | H05K 1/021 |

FOREIGN PATENT DOCUMENTS

JP 2010192749 A 9/2010

* cited by examiner

*Primary Examiner* — Padma Haliyur
(74) *Attorney, Agent, or Firm* — Canon U.S.A., Inc. I.P. Division

(57) ABSTRACT

An imaging apparatus includes a movable member, a supporting member that supports the movable member, a wiring substrate, and a heat transfer member. The movable member includes an image sensor mounted on an imaging substrate having first and second surface sides. The wiring substrate includes first and second electric connection portions and a wiring portion that extends from the first electric connection portion of the wiring substrate. The heat transfer member includes first and second heat fixing portions and a heat connection portion that extends from the first heat fixing portion of the heat transfer member and extends in the same direction as the wiring portion. When viewed from the second surface side, the heat transfer member at least partially overlaps the wiring substrate in a portion different from an area where each of the first electric connection portion and the second electric connection portion is located.

11 Claims, 11 Drawing Sheets

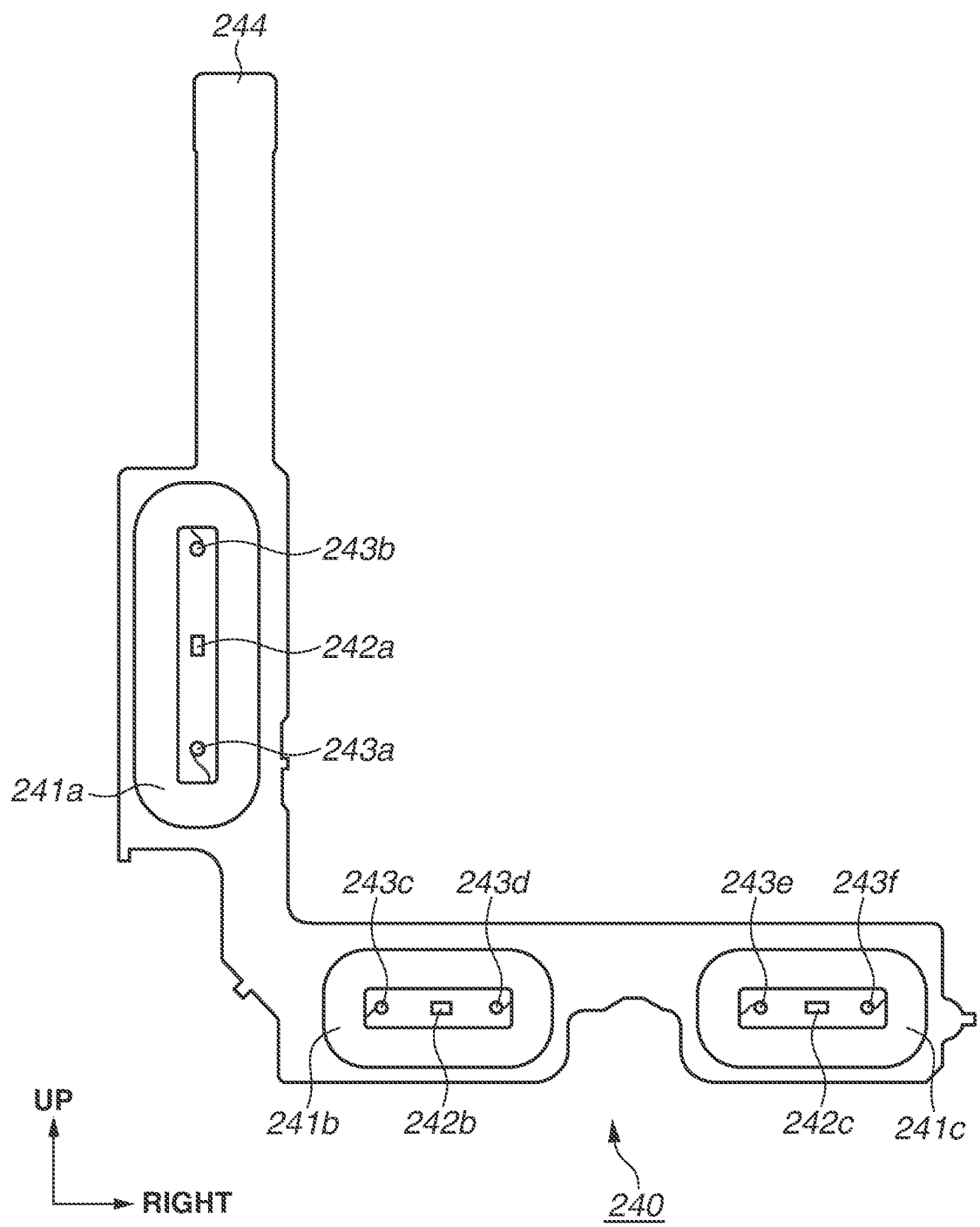

IMAGING APPARATUS

BACKGROUND

Field

The present disclosure relates to an imaging apparatus including an image sensor held in a movable manner.

Description of the Related Art

In an imaging apparatus having an optical image blur correction function, a movable unit supporting an image sensor is moved relative to a fixed unit in a direction orthogonal to an optical axis.

Japanese Patent Application Laid-Open No. 2010-192749 discusses an imaging apparatus in which the movable unit is driven and controlled by a control substrate while the fixed unit and the movable unit are electrically connected to each other.

Meanwhile, with an increase in the number of pixels and an increase in the speed of continuous imaging, such an imaging apparatus has been required to increase the speed of reading from the image sensor in recent years. Accordingly, there arises an issue of image deterioration due to heat generation in the image sensor.

When the imaging apparatus having the optical image blur correction function moves the movable unit in the direction orthogonal to the optical axis, the imaging apparatus can minimize a reaction force inhibiting the movement to improve image stabilization performance.

SUMMARY

The present disclosure is directed to providing an imaging apparatus capable of reducing a temperature rise in an image sensor while suppressing a load increase in displacement of a movable member.

According to an aspect of the present disclosure, an imaging apparatus includes a movable member including an image sensor and configured to be displaced in a direction orthogonal to an optical axis, a supporting member supporting the movable member in a movable manner, a control substrate configured to control the movable member, a wiring substrate having flexibility for electrically connecting the movable member and the control substrate, and a heat transfer member having flexibility for thermally connecting the movable member and the supporting member with heat conductivity higher than heat conductivity of the wiring substrate, on a second surface side that is a side opposite of a first surface of an imaging substrate on which the image sensor is mounted, wherein the wiring substrate includes a first electric connection portion electrically connected to the imaging substrate, a second electric connection portion electrically connected to the control substrate, and a wiring portion extending from the first electric connection portion to the second electric connection portion and including one or more bending portions, wherein the heat transfer member includes a first heat fixing portion thermally connected to the imaging substrate, a second heat fixing portion thermally connected to the supporting member, and a heat connection portion extending from the first heat fixing portion to the second heat fixing portion and including one or more bending portions, wherein the heat connection portion extending from the first heat fixing portion of the heat transfer member extends in the same direction as the wiring portion extending from the first electric connection portion of the wiring substrate, and wherein, when viewed from the second surface side, the heat transfer member at least partially overlaps the wiring substrate in a portion different from an area where each of the first electric connection portion and the second electric connection portion is located.

Further features of the present disclosure will become apparent from the following description of exemplary embodiments with reference to the attached drawings.

BRIEF DESCRIPTION OF THE DRAWINGS

FIG. 5 is a front view of a flexible substrate according to the first exemplary embodiment.

DESCRIPTION OF THE EMBODIMENTS

Exemplary embodiments of the present disclosure will be described in detail below with reference to the drawings.

In each of the exemplary embodiments, an example of an imaging apparatus to which a heat dissipation structure of an image sensor according to the exemplary embodiment is applied will be described.

<Perspective Views of Imaging Apparatus>

Figure 1A:
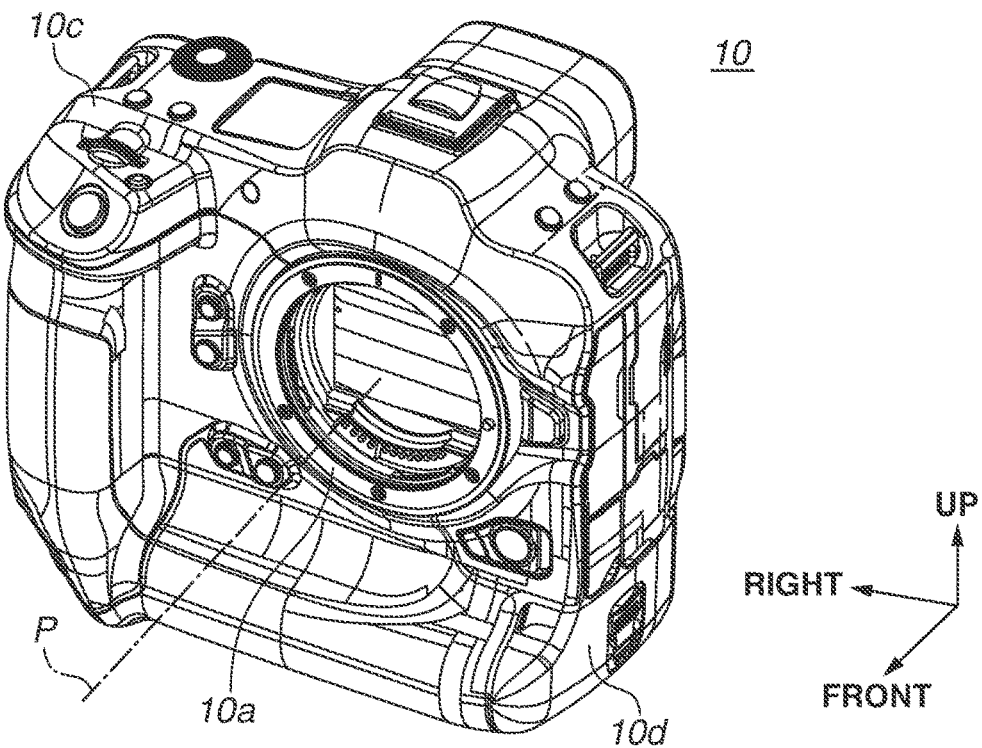
FIGS. 1A and 1B are perspective views of an electronic apparatus according to a first exemplary embodiment.
Figure 1B:
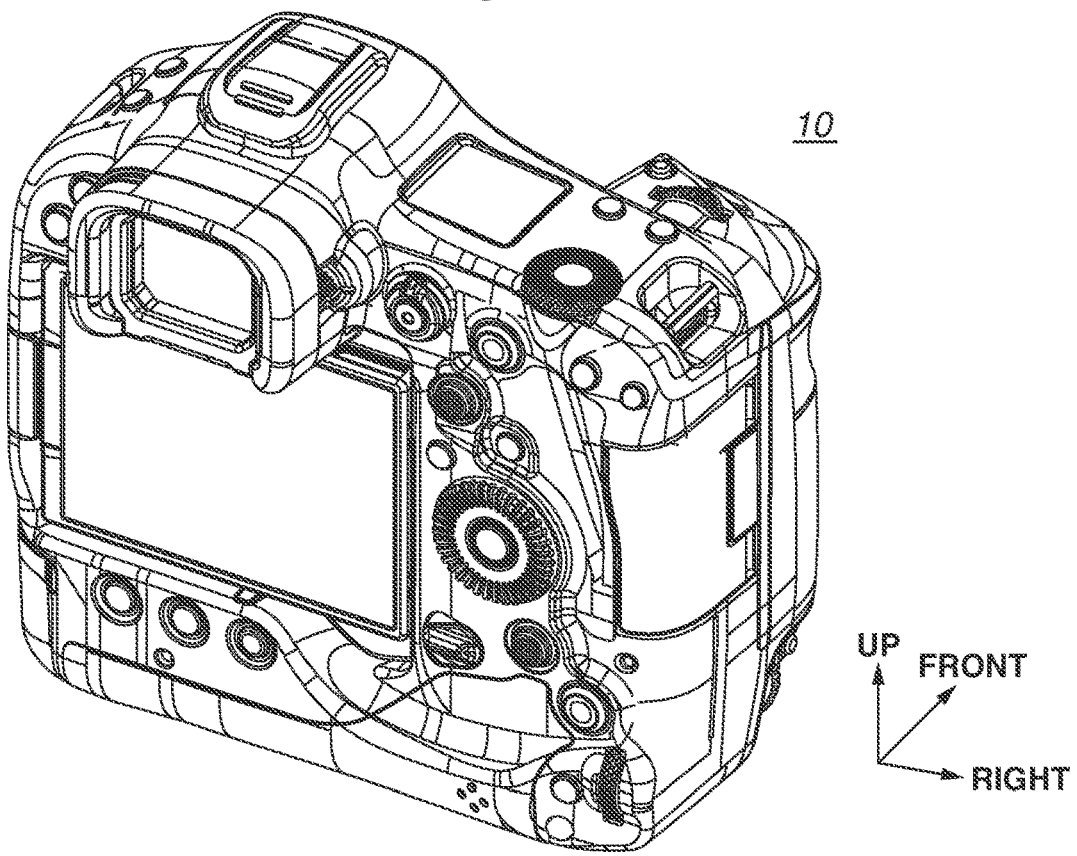

FIGS. 1A and 1B are perspective views of an imaging apparatus 10 according to a first exemplary embodiment of the present disclosure.

Regarding a direction of the imaging apparatus 10, a subject side with respect to a direction viewed from an imaging person (a user) is defined as a front side of the imaging apparatus 10, and an up-down direction, a front-back direction, and a left-right direction of the imaging apparatus 10 are defined as viewed from the user facing a back side of the imaging apparatus 10.

In other words, FIG. 1A is the perspective view of the imaging apparatus 10 as viewed from the front side, and FIG. 1B is the perspective view of the imaging apparatus 10 as viewed from the back side.

In the present exemplary embodiment, an interchangeable lens camera in which a lens apparatus is attachable to a camera main body is described as an example of application to an imaging apparatus. The present exemplary embodiment is also applicable to a camera in which a camera main body and a lens unit are integrated with each other.

The imaging apparatus 10 includes an exterior portion 10c, and the exterior portion 10c includes a plurality of members.

The imaging apparatus 10 also includes a mount 10a on the front side, and an interchangeable lens (a lens apparatus) (not illustrated) is attachable to the mount 10a.

An axis passing through a center of the mount 10a approximately coincides with an optical axis P of an imaging optical system of the interchangeable lens (which is indicated by a dashed-dotted line), i.e., an imaging optical axis. In a bottom portion of the imaging apparatus 10, a battery 10d forming a part of an exterior of the imaging apparatus 10 is inserted into the imaging apparatus 10.

<Exploded Perspective View of Imaging Apparatus>

Figure 2:
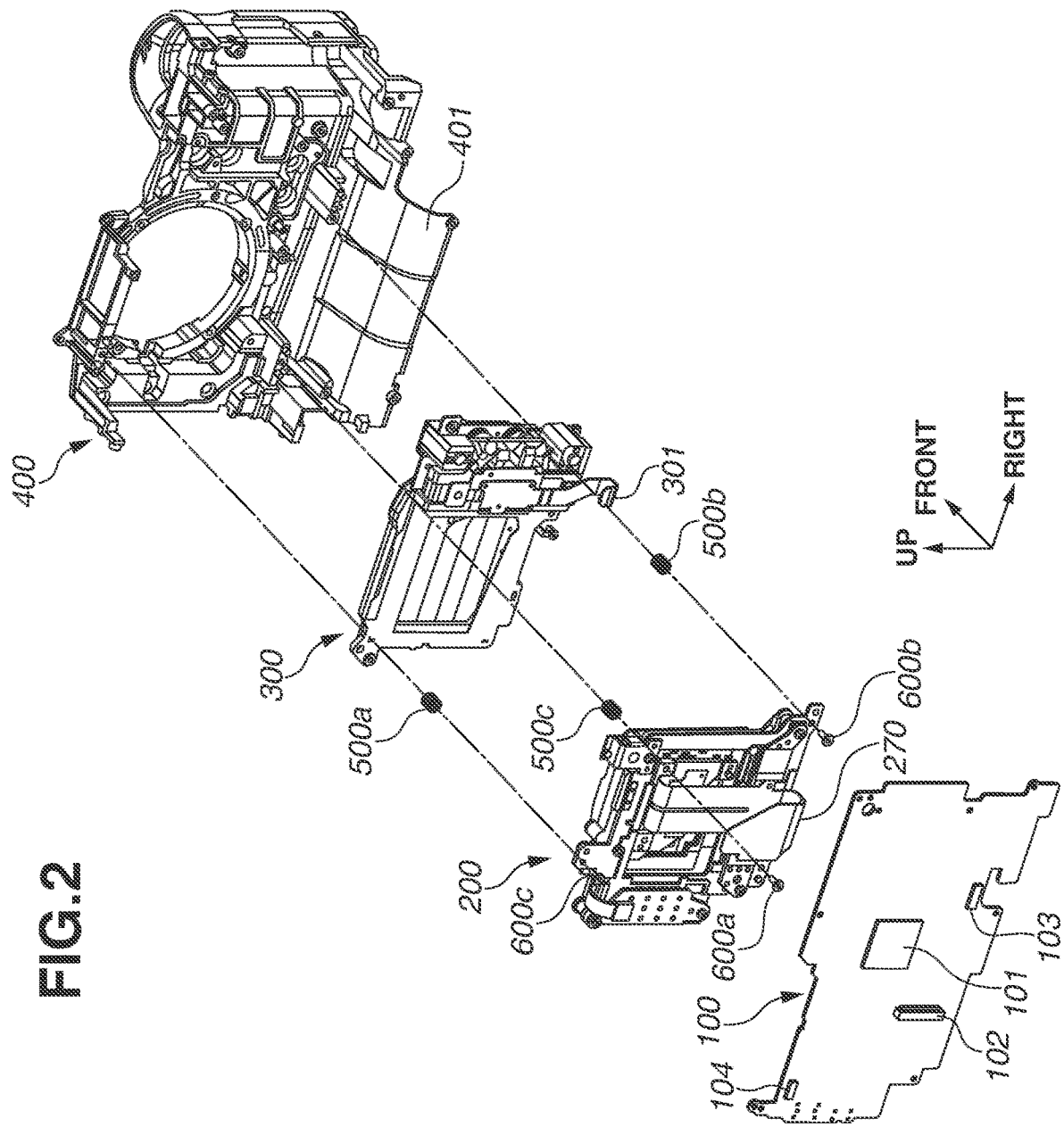
FIG. 2 is an exploded perspective view of a main part of the electronic apparatus according to the first exemplary embodiment.

FIG. 2 is an exploded perspective view of a main part of the imaging apparatus 10 as viewed from the back side (the user side). In FIG. 2, illustration of the exterior portion 10c is omitted.

In FIG. 2 and the subsequent drawings, portions necessary for understanding of the exemplary embodiments of the present disclosure are illustrated and the other portions are not illustrated.

The imaging apparatus 10 includes a control substrate 100, an image blur correction unit 200, a shutter unit 300, and a base member 400.

The image blur correction unit 200 forms an image blur correction apparatus that corrects an image blur of an image. A control unit of the image blur correction apparatus is included in the control substrate 100.

Each of the image blur correction unit 200 and the shutter unit 300 includes a movable optical member.

The image blur correction unit 200 is fixed to the base member 400 together with the shutter unit 300.

The image blur correction unit 200 is held by the base member 400 to which the shutter unit 300 is assembled and fixed.

For example, the image blur correction unit 200 is supported with three screws 600a, 600b, and 600c and three coil springs 500a, 500b, and 500c so as to be displaceable in a direction along the optical axis P (see FIG. 1A) with respect to the base member 400.

A worker performs an operation of adjusting an amount of tightening of each of the screws 600a, 600b, and 600c. The operation can adjust inclination of an imaging plane of an image sensor 230 (see FIG. 3) relative to the base member 400.

When the adjustment of the inclination of the imaging plane is completed, the screws 600a, 600b, and 600c are bonded and fixed to a fixed unit 200b (see FIG. 3) of the image blur correction unit 200 in order to prevent the screws 600a, 600b, and 600c from loosening. The fixed unit 200b is a supporting member and will be described below with reference to FIG. 3.

A bottom portion of the base member 400 includes a battery chamber upper wall 401 forming a part of an accommodation portion for the battery 10d.

The control substrate 100 and the base member 400 are fixed to the exterior portion 10c. On the control substrate 100, a control integrated circuit (IC) 101 used to control an imaging signal, and connectors 102 and 103 are mounted.

On the control substrate 100, various electronic components (not illustrated) such as a chip resistor, a ceramic capacitor, an inductor, and a transistor are also mounted.

As a flexible wiring member, a flexible substrate 270 extending from the image blur correction unit 200 is illustrated.

The flexible substrate 270 is connected to the connector 102. This establishes an electrical connection between the control substrate 100 and the image blur correction unit 200.

The connector 103 disposed on the control substrate 100 is connected to a flexible substrate 301 extending from the shutter unit 300. This establishes an electrical connection between the control substrate 100 and the shutter unit 300.

<Image Blur Correction Unit>

The image blur correction unit 200 will be described next with reference to FIGS. 3 and 4.

Figure 3:
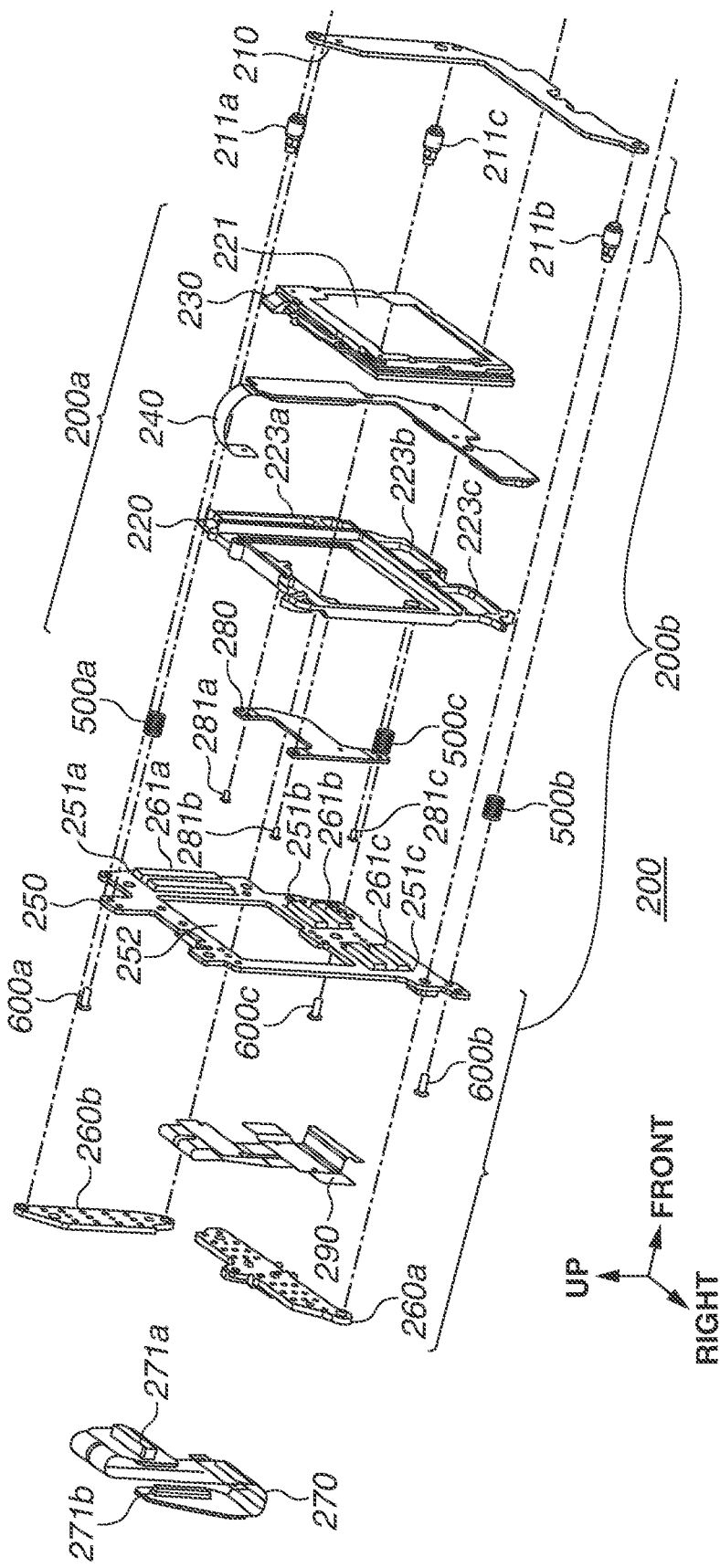
FIG. 3 is an exploded perspective view of an image blur correction unit according to the first exemplary embodiment.
Figure 4:
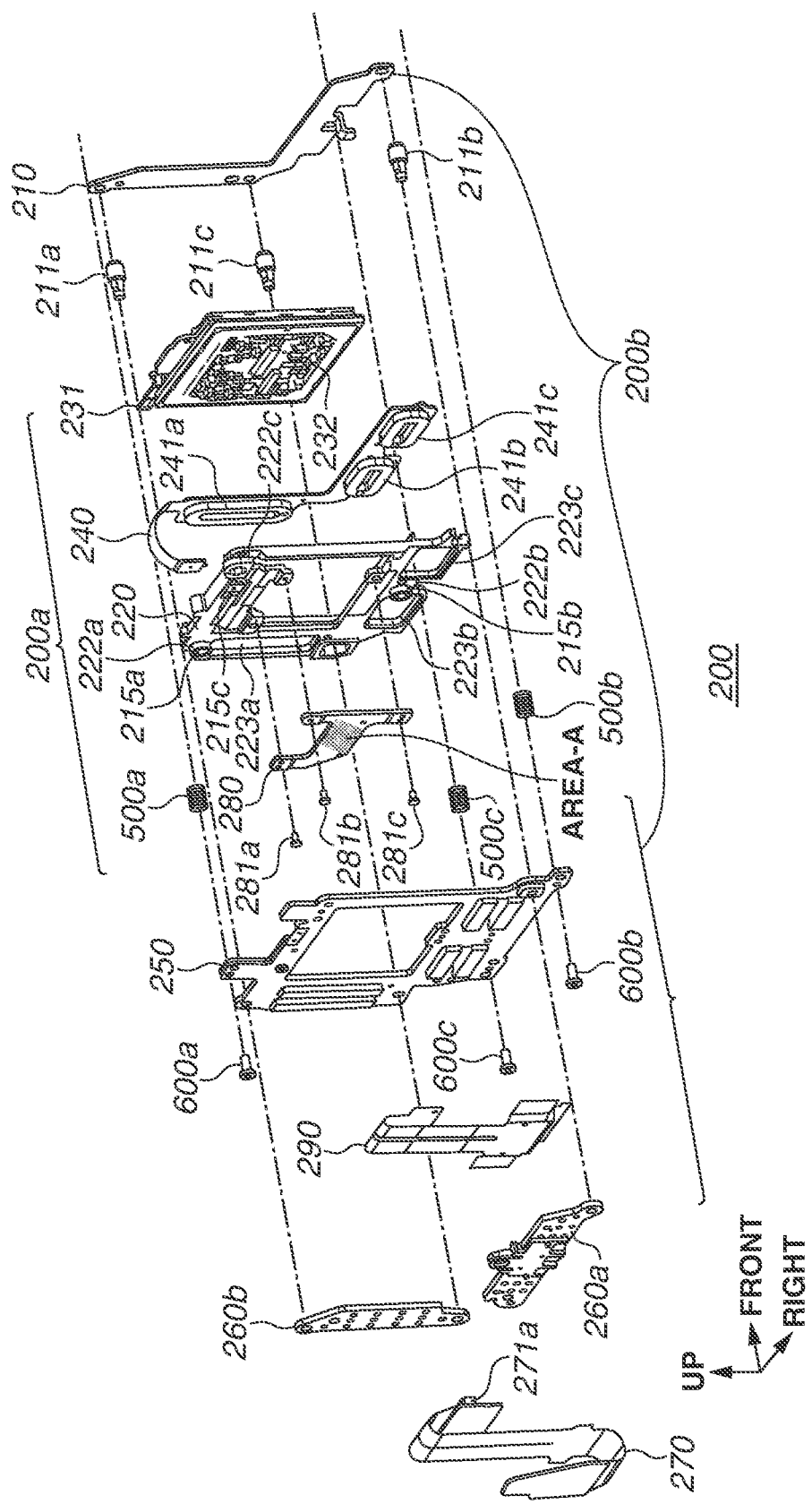
FIG. 4 is an exploded perspective view of the image blur correction unit according to the first exemplary embodiment as seen from a direction different from that in FIG. 3.

FIGS. 3 and 4 are exploded perspective views of the image blur correction unit 200.

The image blur correction unit 200 includes a movable unit 200a and the fixed unit 200b. The movable unit 200a is a movable member including the image sensor 230.

The fixed unit 200b is the supporting member fixed to the base member 400.

The movable unit 200a is supported by the fixed unit 200b in a state where the movable unit 200a can be displaced in any direction within a plane orthogonal to the optical axis P with respect to the fixed unit 200b.

An optical image blur correction operation is implemented by movement of the movable unit 200a in a direction orthogonal to the optical axis P.

Main components of the fixed unit 200b are a front yoke 210, a base plate 250, and back yokes 260a and 260b.

Main components of the movable unit 200a are a movable frame 220, a flexible substrate 240, a heat transfer function holding member 280, and a sheet-like heat transfer member 290.

The flexible substrates 240 and 270 connect the movable unit 200a and the control substrate 100.

Each of the flexible substrates 270 and 240 is a flexible printed board having flexibility.

The movable unit 200a includes an image sensor substrate 231, and the image sensor 230 is mounted on the image sensor substrate 231. The image sensor 230 is a complementary metal-oxide-semiconductor (CMOS) image sensor or a charge-coupled device (CCD) image sensor, and converts an optical image of a subject into an electric signal.

The image sensor substrate 231 on which the image sensor 230 is mounted is bonded and fixed to the movable frame 220.

In the movable frame 220, an optical low-pass filter 221 is disposed closer to the front side than the image sensor 230. The optical low-pass filter 221 is an optical element for preventing occurrence of color moiré.

In the movable frame 220, three opening portions 223a, 223b, and 223c are formed.

On the flexible substrate 240, three coils 241a, 241b, and 241c are mounted (see FIG. 4).

The flexible substrate 240 is incorporated into the movable frame 220 from the front side, and bonded and fixed to the movable frame 220. The coils 241a, 241b, and 241c are accommodated in the opening portions 223a, 223b, and 223c, respectively.

In the movable frame 220, three ball receiving portions 222a, 222b, and 222c (see FIG. 4) are formed.

The movable frame 220 and the base plate 250 sandwich balls 215a, 215b, and 215c between the ball receiving portions 222a, 222b, and 222c and the corresponding ball receiving portions, respectively.

Accordingly, the balls 215a, 215b, and 215c (see FIG. 4) are supported in a rollable manner.

On the front yoke 210 illustrated in FIG. 3, supporting columns 211a, 211b, and 211c are erected toward the base plate 250.

One end portion of each of the supporting columns 211a, 211b, and 211c is press-fitted into the base plate 250. The front yoke 210 and the base plate 250 are joined together to sandwich the movable frame 220 therebetween.

In the base plate 250 illustrated in FIG. 3, opening portions 251a, 251b, and 251c are formed at positions different from each other as viewed in the direction of the optical axis P.

Magnets 261a, 261b, and 261c are incorporated into the opening portions 251a, 251b, and 251c, respectively.

When viewed in the direction of the optical axis P, the magnets 261a, 261b, and 261c are formed into the same shapes as those of the coils 241a, 241b, and 241c at approximately the same positions as those of the coils 241a, 241b, and 241c, respectively.

The magnets 261a, 261b, and 261c are disposed at the positions where centers of the magnets 261a, 261b, and 261c approximately coincide with centers of the coils 241a, 241b, and 241c, respectively.

The assembling method is as follows. The magnets 261a, 261b, and 261c are disposed so as to be accommodated in the opening portions 251a, 251b, and 251c, respectively. Then, the back yokes 260a and 260b are attached to the base plate 250 from the back side.

Each of the back yoke 260a, the back yoke 260b, and the base plate 250 is formed of a ferromagnetic material.

In the assembling, the back yokes 260a and 260b to which the magnets 261a, 261b, and 261c are stuck are simply aligned and brought into contact with the base plate 250, so that the back yokes 260a and 260b and the base plate 250 are magnetically attracted to each other. In other words, the two components can be joined without using an adhesive.

In the base plate 250, an opening portion 252 is also formed.

In a state where the movable frame 220 is sandwiched between the front yoke 210 and the base plate 250, the image sensor substrate 231 is exposed through the opening portion 252 on the back side.

As illustrated in FIG. 4, a connector 232 is mounted on the image sensor substrate 231.

As illustrated in FIG. 3, a connector 271a is mounted on the flexible substrate 270.

The worker passes the flexible substrate 270 through the opening portion 252 from the back side, incorporates the flexible substrate 270 into the image sensor substrate 231, and engages the connectors 232 and 271a.

The connectors 232 and 271a have a relationship between a plug connector and a receptacle connector of which the engagement shapes fit each other.

The flexible substrate 270 has a long plate shape. The connector 271a is mounted on one end portion of the flexible substrate 270. A connector 271b is mounted on the other end portion of the flexible substrate 270.

The connector 271b and the connector 102 (see FIG. 2) mounted on the control substrate 100 have the relationship between a plug connector and a receptacle connector of which the engagement shapes fit each other.

The connector 271b and the connector 102 are connected together, so that an electrical connection is established between the flexible substrate 270 and the image sensor substrate 231.

As illustrated in FIG. 4, the heat transfer function holding member 280 is fixed to the movable frame 220 from the back side with screws 281a, 281b, and 281c.

This configuration enables the heat transfer function holding member 280 and the movable frame 220 to transfer heat therebetween. In a sticking portion AREA-A, the heat transfer function holding member 280 has a flat surface to which the heat transfer member 290 can be fixed.

In the sticking portion AREA-A, the heat transfer member 290 is fixed to the heat transfer function holding member 280 with double-sided tape (with a thickness of about 10 μm) having excellent heat conductivity.

<Flexible Substrate>

The flexible substrate 240 will be described next with reference to FIG. 5. FIG. 5 is a front view of the flexible substrate 240.

The coils 241a, 241b, and 241c are bonded and fixed to the flexible substrate 240.

In the flexible substrate 240, soldering lands 243a, 243b, 243c, 243d, 243e, and 243f for electrically connecting to windings of the coils 241a, 241b, and 241c are formed.

End portions at the start and end of the winding of the coil 241a are soldered to the soldering lands 243a and 243b.

Similarly, end portions at the start and end of the winding of the coil 241b are soldered to the soldering lands 243c and 243d.

Similarly, end portions at the start and end of the winding of the coil 241c are soldered to the soldering lands 243e and 243f.

The above soldering operations enable the coils 241a, 241b, and 241c to be electrically connected to the flexible substrate 240.

On the flexible substrate 240, Hall elements 242a, 242b, and 242c are mounted inside the windings of the coils 241a, 241b, and 241c, respectively.

Each of the Hall elements 242a, 242b, and 242c is disposed at an approximately intermediate position between the corresponding pair of the soldering lands 243a to 243f inside the winding of the corresponding one of the coils 241a, 241b, and 241c.

A connector terminal portion 244 is formed in one end portion in a longitudinal direction of the flexible substrate 240.

A plurality of wiring patterns from the soldering lands 243a to 243f and the Hall elements 242a to 242c is arranged in the flexible substrate 240 and connected to the connector terminal portion 244.

The connector terminal portion 244 is connected to a connector 104 mounted on the control substrate 100.

As described above, the magnets 261a, 261b, and 261c disposed on the base plate 250 form magnetic paths, and the coils 241a, 241b, and 241c are disposed in the magnetic field environments.

The control unit controls currents flowing through the coils 241a, 241b, and 241c, thereby generating a Lorentz force in each of the coils 241a, 241b, and 241c.

Using the Lorentz force as a thrust force, the movable frame 220 can be displaced in any direction within the plane orthogonal to the optical axis P.

The Hall elements 242a, 242b, and 242c are mounted inside the coils 241a, 241b, and 241c, respectively.

Then, changes in the magnetic forces caused by the movement of the movable frame 220 relative to the magnets 261a, 261b, and 261c are detected.

Based on detection signals of the Hall elements 242a, 242b, and 242c, an amount of displacement of the movable unit 200a relative to the fixed unit 200b, i.e., an amount of displacement in any direction within the plane orthogonal to the optical axis P can be detected.

Image blur directions in the imaging apparatus 10 are a pitch direction, a yaw direction, and a roll direction.

The pitch direction and the yaw direction are two directions about axes perpendicular to the optical axis P of the imaging optical system and orthogonal to each other, and the roll direction is a direction about an axis parallel to the optical axis P.

To correct an image blur in the pitch direction, which is the rotation direction about the axis in the left-right direction, the movable unit 200a is translationally moved in the up-down direction.

To correct an image blur in the yaw direction, which is the rotation direction about the axis in the up-down direction, the movable unit 200a is translationally moved in the left-right direction.

To correct an image blur in the roll direction, which is the rotation direction about the axis in the front-back direction, the movable unit 200a is rotationally moved about the axis parallel to the axis in the front-back direction.

<Configurations of Flexible Substrate and Heat Transfer Member>

Configurations of the flexible substrate 270 and the heat transfer member 290 will be described next with reference to FIGS. 6A to 7B.

Figure 6B:
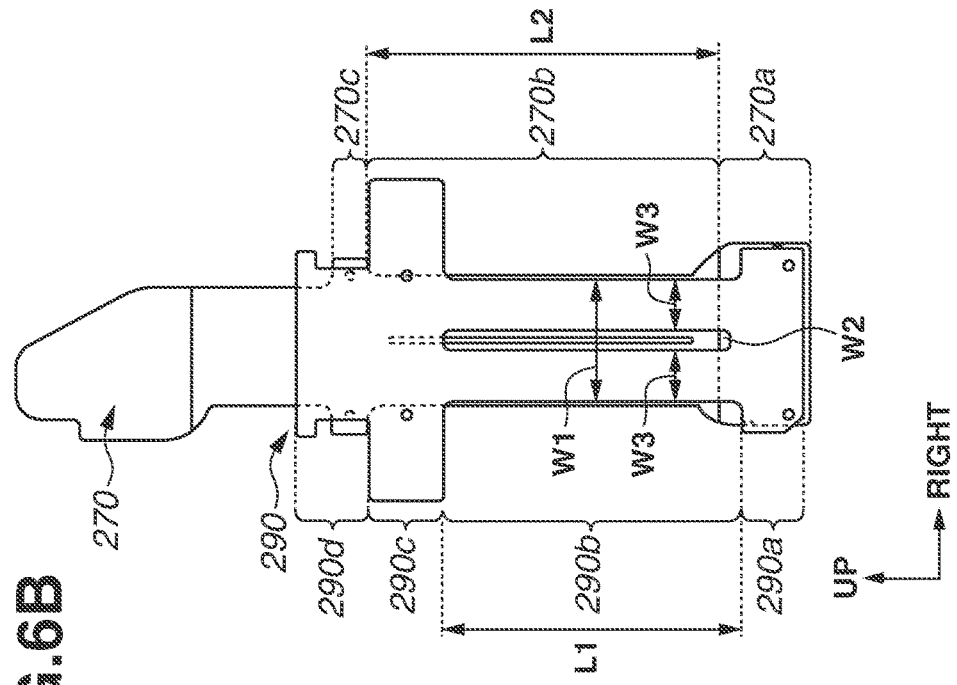
FIG. 6B is a front view of the flexible substrate and the heat transfer member according to the first exemplary embodiment in the unfolded state.
Figure 6A:
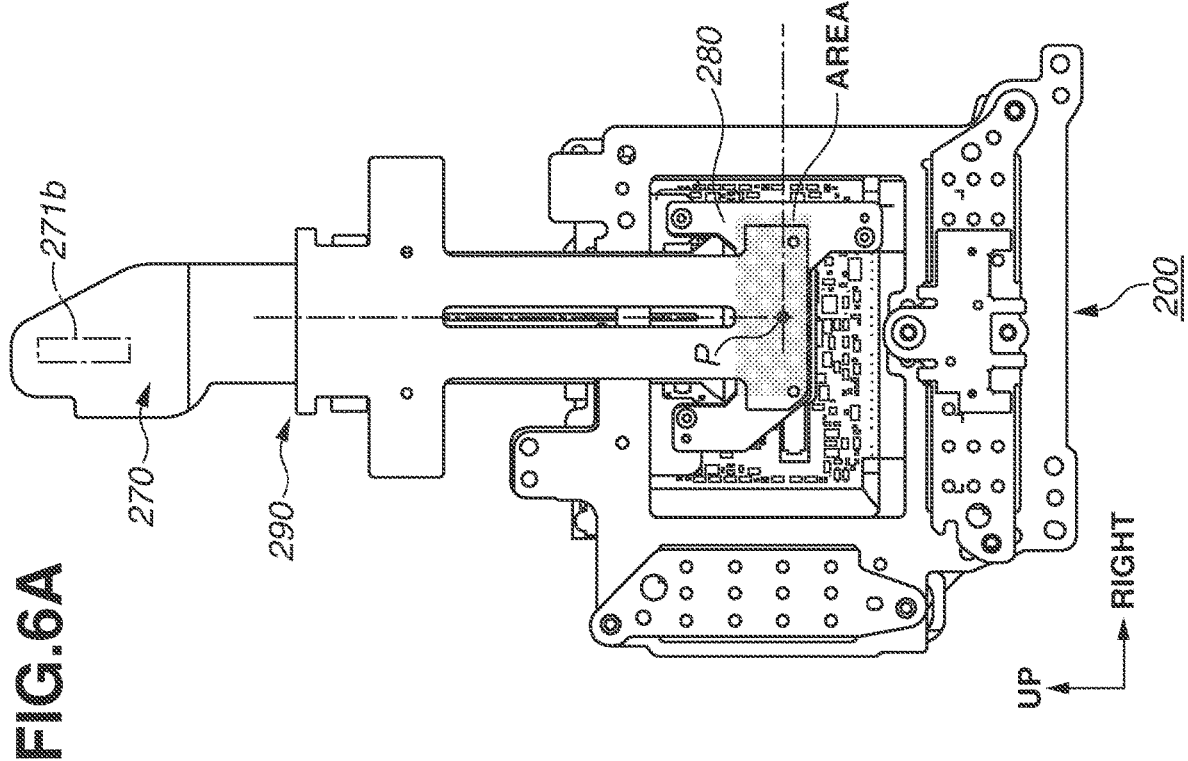
FIG. 6A is a rear view of the image blur correction unit to which the flexible substrate and a heat transfer member according to the first exemplary embodiment are fixed in an unfolded state.

FIG. 6A is a rear view of the image blur correction unit 200 to which the flexible substrate 270 and the heat transfer member 290 according to the present exemplary embodiment are fixed in an unfolded state.

FIG. 6B is a front view of the flexible substrate 270 and the heat transfer member 290 according to the present exemplary embodiment in the unfolded state.

Figure 7A:
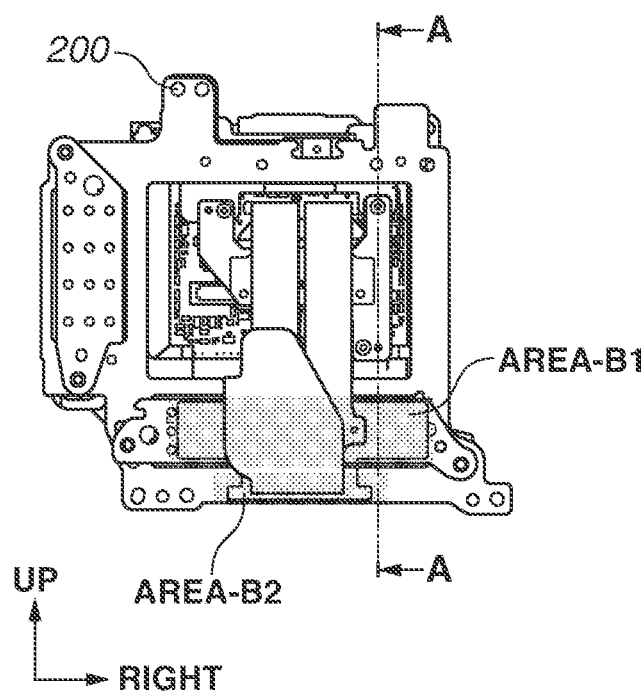
FIG. 7A is a rear view of the image blur correction unit to which the flexible substrate and the heat transfer member according to the first exemplary embodiment are fixed in an assembled state.

FIG. 7A is a rear view of the image blur correction unit 200 to which the flexible substrate 270 and the heat transfer member 290 according to the present exemplary embodiment are fixed in an assembled state.

Figure 7B:
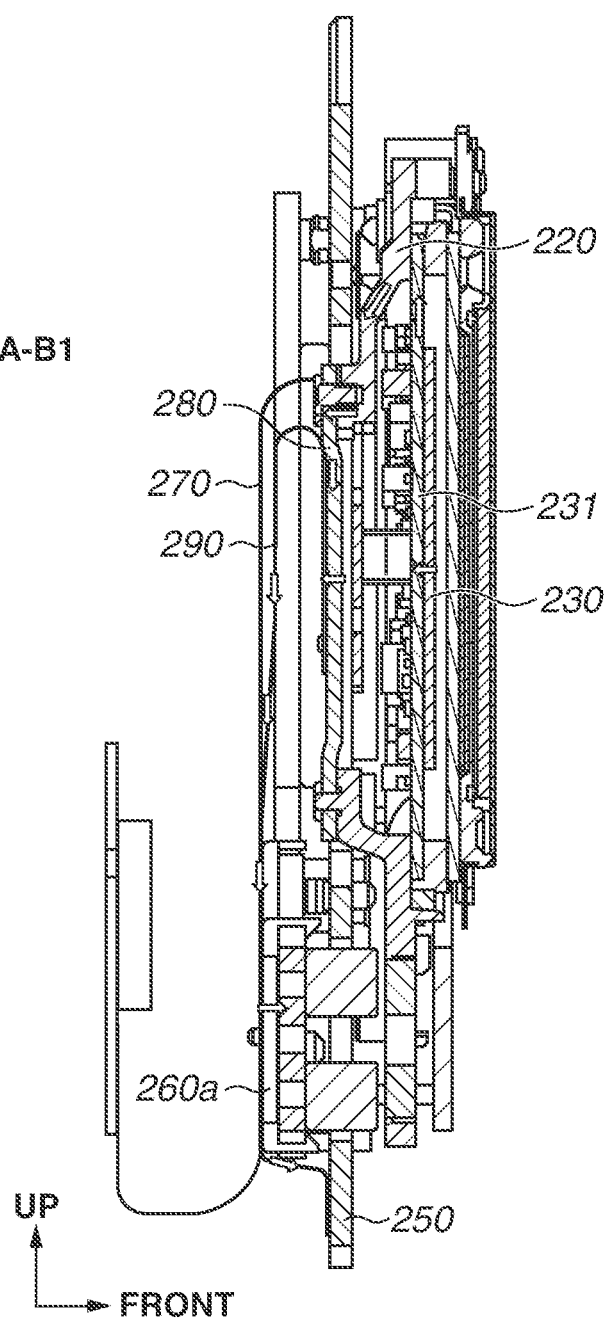
FIG. 7B is a cross-sectional view taken along a line A-A (in FIG. 7A).

FIG. 7B is a cross-sectional view taken along a line A-A in FIG. 7A.

As illustrated in FIG. 6A, in the image blur correction unit 200, the flexible substrate 270, the heat transfer function holding member 280, and the heat transfer member 290 are disposed in an overlapping manner in order from the front side of the imaging apparatus 10.

The heat transfer member 290 is fixed to the heat transfer function holding member 280 in the sticking portion AREA-A for the heat transfer member 290.

The flexible substrate 270 and the heat transfer member 290 extend in the same direction and have outer shapes in which at least parts of the flexible substrate 270 and the heat transfer member 290 overlap each other.

The heat transfer member 290 is fixed to the heat transfer function holding member 280 in the sticking portion AREA-A for the heat transfer member 290.

Furthermore, in the assembled state as illustrated in FIG. 7A, each of the flexible substrate 270 and the heat transfer member 290 includes a bending portion bending once about an axis parallel to the left-right direction and is fixed to the fixed unit 200b.

More specifically, the flexible substrate 270 and the heat transfer member 290 are fixed to the back yoke 260a in an area AREA-B1.

The heat transfer member 290 further extends beyond the area AREA-B1 and is fixed to the base plate 250 in an area AREA-B2.

The flexible substrate 270 and the heat transfer member 290 are fixed to the fixed unit 200b in a state where a certain amount of deflection is formed, thereby maintaining a deflection shape having a predetermined amount of deflection.

The predetermined amount is a deflection amount capable of maintaining the flexible substrate 270 and the heat transfer member 290 without full extension in a case where the movable unit 200a is displaced to a position furthest away from the optical axis P.

As illustrated in FIG. 6B, the flexible substrate 270 is formed of three main areas, i.e., two rigid portions (first and second connection portions 270a and 270c) and a flexible portion (a first wiring portion 270b) linking the rigid portions.

Each of the rigid portions (the first and second connection portions 270a and 270c) is made rigid by sticking an insulation reinforcement material such as a glass epoxy resin to a flexible portion (a wiring portion) with a thermosetting adhesive, and the connector 271a or 271b is mounted on a surface of the flexible portion (the wiring portion).

The flexible substrate 270 includes the first connection portion 270a, the first wiring portion 270b, and the second connection portion 270c in order from the side closer to the connector 271a (see FIG. 3) in a wiring direction that is the longitudinal direction of the flexible substrate 270.

The first wiring portion 270b extends from the first connection portion 270a in a first direction orthogonal to the optical axis P. The first direction is the upward direction in FIGS. 6A and 6B.

The connector 271a is disposed in the first connection portion 270a, and the connector 271b is disposed in the second connection portion 270c.

In the wiring direction of the flexible substrate 270, the first wiring portion 270b is disposed in an area between the first connection portion 270a and the second connection portion 270c. The first wiring portion 270b has flexibility and electrically connects the connectors 271a and 271b.

Each of the first connection portion 270a and the second connection portion 270c is made rigid by sticking an insulation reinforcement material such as a glass epoxy resin thereto with a thermosetting adhesive.

In each of the first connection portion 270a and the second connection portion 270c, on a surface on an opposite side of a surface to which the insulation reinforcement material is stuck, the connector for substrate to substrate connection (the connector 271a or 271b) is mounted.

As illustrated in FIG. 6B, the heat transfer member 290 is formed of four main areas.

The heat transfer member 290 includes a heat transfer holding member sticking portion 290a, a heat transfer member non-fixed portion 290b, a back yoke fixing portion 290c, and a base plate fixing portion 290d in order from the movable unit 200a side in a heat transfer direction that is the longitudinal direction of the heat transfer member 290.

The heat transfer member 290 is formed of a sheet member, such as a graphite sheet, having flexibility with a thickness of about 0.1 mm, and double-sided tape (not illustrated) is disposed in each of the back yoke fixing portion 290c and the base plate fixing portion 290d.

Shapes of the heat transfer member non-fixed portion 290b and the first wiring portion 270b will be described in detail.

Assuming that a length of the heat transfer member non-fixed portion 290b is L1, and a length of the first wiring portion 270b is L2, the lengths L1 and L2 satisfy the following relation:

$$L2 > L1$$

Accordingly, in a state where the assembling of the unit is completed as illustrated in FIGS. 7A and 7B, a space can be provided between the bending portions of the heat transfer member non-fixed portion 290b and the first wiring portion 270b. The space can reduce a load due to rubbing friction between the heat transfer member non-fixed portion 290b and the first wiring portion 270b. As a result, it is possible to improve movability in image blur correction.

The heat transfer member non-fixed portion 290b includes a slit parallel to an extending direction thereof. Assuming that a width of the slit is W2, an entire width of the heat transfer member non-fixed portion 290b is W1, and a width of each of parts into which the heat transfer member non-fixed portion 290b is divided by the slit is W3, the widths W1, W2, and W3 satisfy the following relation (1).

$$W3 = \frac{(W1 - W2)}{2} \quad (1)$$

Accordingly, it is possible to reduce a movement load in the left-right direction due to the heat transfer member non-fixed portion 290b, and also uniformize the movement load on the left and right sides. By uniformizing the movement load on the left and right sides, it is possible to improve controllability in image blur correction.

<Heat Dissipation Path of Image Sensor>

A heat dissipation path of the image sensor 230 will be described next with reference to FIG. 7B.

Arrows in FIG. 7B indicate a heat dissipation outflow direction in a simulated manner.

Heat generated in the image sensor 230 is transferred to the image sensor substrate 231 fixed in a die bonding process.

The image sensor substrate 231 includes an area partially overlapping the movable frame 220. The image sensor substrate 231 comes into planar contact with the movable frame 220 in the area, thereby transferring the heat to the movable frame 220.

The heat transferred to the movable frame 220 is transferred to the heat transfer function holding member 280 at three screw fixing portions (see FIG. 4) and is transferred to the heat transfer member 290.

The heat transfer member 290 in the movable unit 200a transfers the heat to the back yoke 260a and the base plate 250 in the fixed unit 200b.

The heat transferred to the base plate 250 is transferred to the base member 400 and then is transferred to the exterior portion 10c and dissipated to the outside air.

As described above, the heat transfer member 290 has a path that extends in the upward direction, bends once, and dissipates the heat in the downward direction.

In the configuration of the imaging apparatus 10, this results in a path that dissipates heat to a battery chamber portion disposed in the bottom portion of the imaging apparatus 10.

Because the battery 10d is a member having a relatively large heat capacity in the imaging apparatus 10, an arrival point of the heat dissipation path is provided in a battery portion, so that it is possible to efficiently dissipate the heat of the image sensor 230.

An increase in load and complication of control cause an increase in the size of a magnet or a coil for use in high-accuracy control and result in an increase in the size of the imaging apparatus 10.

Thus, the prevention of an increase in load and the simplification of control contribute to the miniaturization of the imaging apparatus 10 and a reduction in power consumption.

With the above configuration, it is possible to provide an electronic apparatus capable of dissipating the heat of an image sensor while suppressing a load increase in displacement of a movable member.

A summary of the present exemplary embodiment will be described.

The movable unit (the movable member) 200a including the image sensor 230 can be displaced in the direction orthogonal to the optical axis P.

The fixed unit (the supporting member) 200b supports the movable unit (the movable member) 200a in a movable manner.

The control substrate 100 controls the movable unit (the movable member) 200a.

The flexible substrate (the wiring substrate) 270 has flexibility for electrically connecting the movable unit (the movable member) 200a and the control substrate 100.

The heat transfer member 290 has flexibility for thermally connecting the movable unit (the movable member) 200a and the fixed unit (the supporting member) 200b with heat conductivity higher than heat conductivity of the flexible substrate (the wiring substrate) 270, on a second surface side being an opposite side of a first surface of the image sensor substrate (the imaging substrate) 231 on which the image sensor 230 is mounted.

The flexible substrate (the wiring substrate) 270 includes the first connection portion (the first electric connection portion) 270a electrically connected to the image sensor substrate (the imaging substrate) 231, and the second connection portion (the second electric connection portion) 270c electrically connected to the control substrate 100.

The flexible substrate (the wiring substrate) 270 also includes the first wiring portion (the wiring portion) 270b extending from the first connection portion (the first electric connection portion) 270a to the second connection portion (the second electric connection portion) 270c and including one or more bending portions.

The heat transfer member 290 includes the heat transfer holding member sticking portion (the first heat fixing portion) 290a thermally connected to the image sensor substrate (the imaging substrate) 231 and the back yoke fixing portion (the second heat fixing portion) 290c thermally connected to the fixed unit (the supporting member) 200b.

The heat transfer member 290 also includes the heat transfer member non-fixed portion (the heat connection portion) 290b extending from the heat transfer holding member sticking portion (the first heat fixing portion) 290a to the back yoke fixing portion (the second heat fixing portion) 290c and including one or more bending portions.

The heat transfer member non-fixed portion (the heat connection portion) 290b extending from the heat transfer holding member sticking portion (the first heat fixing portion) 290a of the heat transfer member 290 extends in the same direction as the first wiring portion (the wiring portion) 270b extending from the first connection portion (the first electric connection portion) 270a of the flexible substrate (the wiring substrate) 270.

When viewed from the second surface side, the heat transfer member 290 at least partially overlaps the flexible substrate (the wiring substrate) 270 in a portion different from an area where each of the first connection portion (the first electric connection portion) 270a and the second connection portion (the second electric connection portion) 270c is located.

The length L1 of the heat transfer member non-fixed portion (the heat connection portion) 290b of the heat transfer member 290 is shorter than the length L2 of the first wiring portion (the wiring portion) 270b of the flexible substrate (the wiring substrate) 270.

When viewed from the second surface side, the first connection portion (the first electric connection portion) 270a and the heat transfer holding member sticking portion (the first heat fixing portion) 290a overlap each other, the second connection portion (the second electric connection portion) 270c and the back yoke fixing portion (the second heat fixing portion) 290c overlap each other, and the first wiring portion (the wiring portion) 270b and the heat transfer member non-fixed portion (the heat connection portion) 290b overlap each other.

The heat transfer member non-fixed portion (the heat connection portion) 290b of the heat transfer member 290 includes one or more slit portions.

The heat transfer member non-fixed portion (the heat connection portion) 290b of the heat transfer member 290 has a symmetrical shape in a direction orthogonal to the extending direction.

Furthermore, the battery chamber upper wall (the battery chamber) 401 is provided via the base plate 250 at a position where the heat transfer member 290 is fixed to the fixed unit (the supporting member) 200b.

On the second surface side, the movable unit (the movable member) 200a includes the heat transfer function holding member (the metal plate) 280 to which the heat transfer member 290 can be fixed on an electric component mounted on the image sensor substrate (the imaging substrate) 231.

In a second exemplary embodiment, a configuration in which a separation member 700 is further added to the configuration according to the first exemplary embodiment will be described.

Components similar to those in the first exemplary embodiment are designated by the same reference numerals, and redundant descriptions thereof will be omitted.

Figure 8:
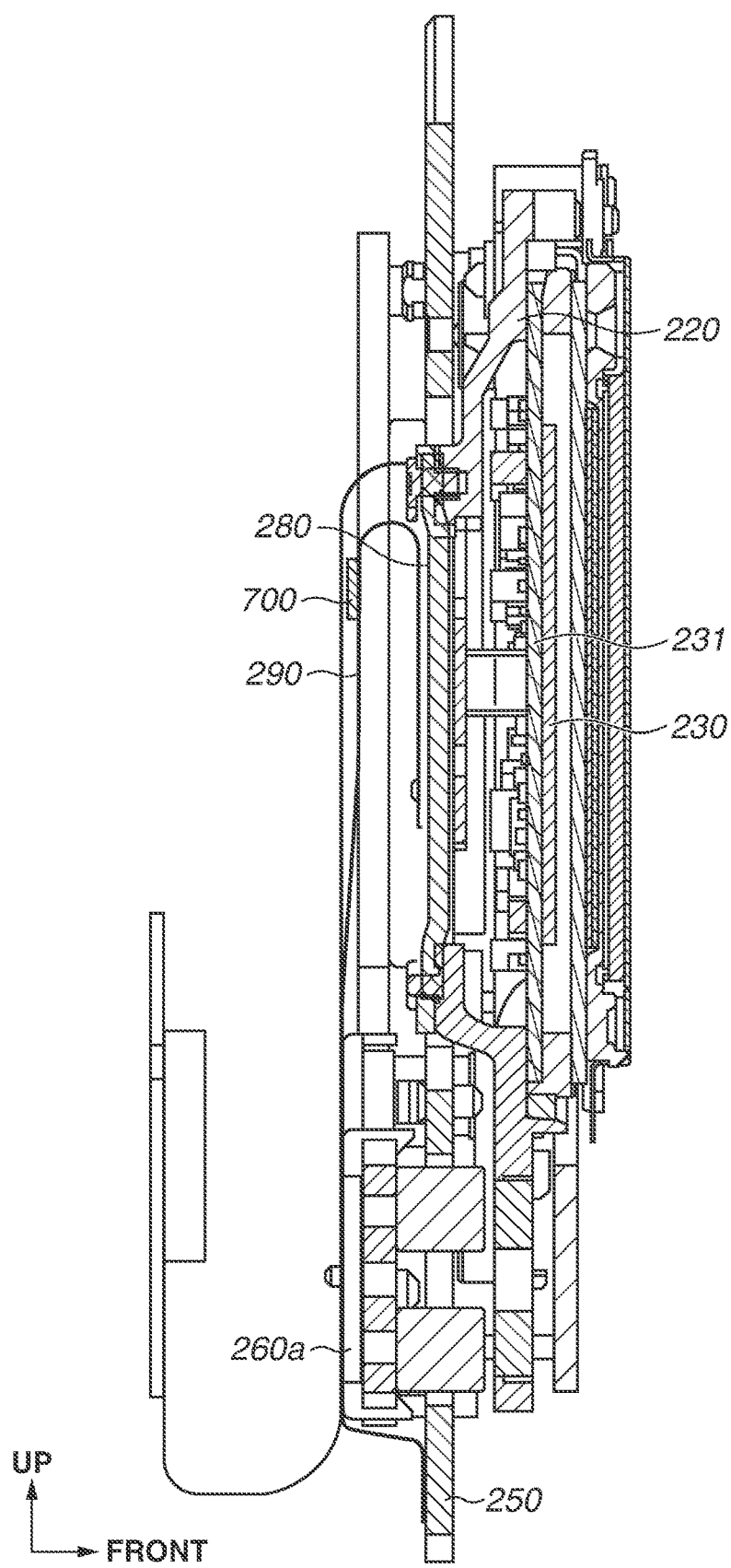
FIG. 8 is a cross-sectional view taken along the line A-A (in FIG. 7A) in a configuration where a separation member according to a second exemplary embodiment is added.

FIG. 8 is a cross-sectional view taken along the line A-A (in FIG. 7A) in the configuration according to the present exemplary embodiment in which the separation member 700 is added.

As illustrated in FIG. 8, the separation member 700 is fixed to the heat transfer member 290 in the heat transfer member non-fixed portion 290b.

The separation member 700 is used as a spacer for securing a space with a predetermined distance between the flexible substrate 270 and the heat transfer member 290. As the separation member 700, a member having flexibility and having low frictional resistance on a surface opposing the flexible substrate 270 is suitable. For example, a member having a configuration in which a polyethylene terephthalate (PET) sheet is stuck on foam may be used.

With the above configuration, it is possible to limit the contact portion between the flexible substrate 270 and the heat transfer member 290 to the separation member 700. Thus, it is possible to control and minimize the contact area.

As a result, it is possible to provide an electronic apparatus capable of dissipating the heat of an image sensor while suppressing a load increase in displacement of a movable member.

A summary of the present exemplary embodiment will be described.

The separation member 700 is included between the heat transfer member 290 and the flexible substrate (the wiring substrate) 270 in a portion different from the area where each of the first connection portion (the first electric connection portion) 270a and the second connection portion (the second electric connection portion) 270c is located.

In a third exemplary embodiment, a configuration in which heat transfer members are added to the configuration according to the first exemplary embodiment will be described. Components similar to those in the first exemplary embodiment are designated by the same reference numerals, and redundant descriptions thereof will be omitted.

Figure 9A:
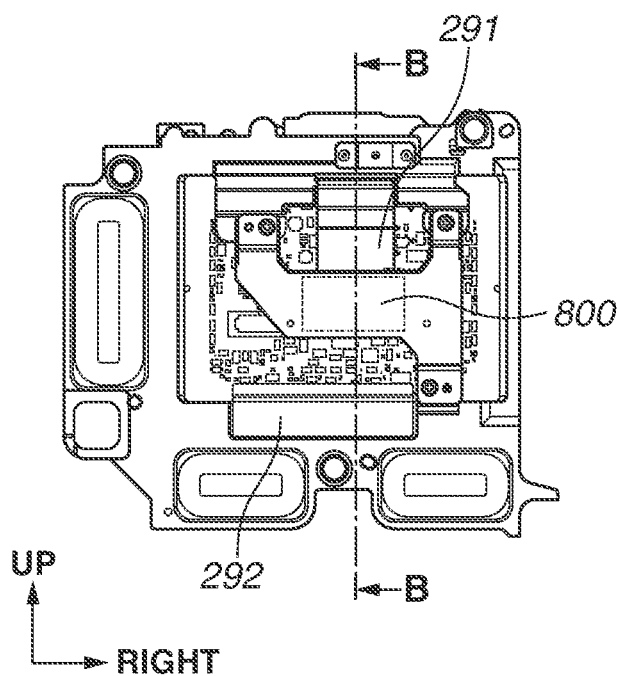
FIG. 9A is a rear view of a movable unit to which sheet-like heat transfer members and a heat transfer member capable of transferring heat in a thickness direction according to a third exemplary embodiment are added.

FIG. 9A is a rear view of the movable unit 200a in which sheet-like heat transfer members and a heat transfer member capable of transferring heat in a thickness direction according to the present exemplary embodiment are added.

Figure 9B:
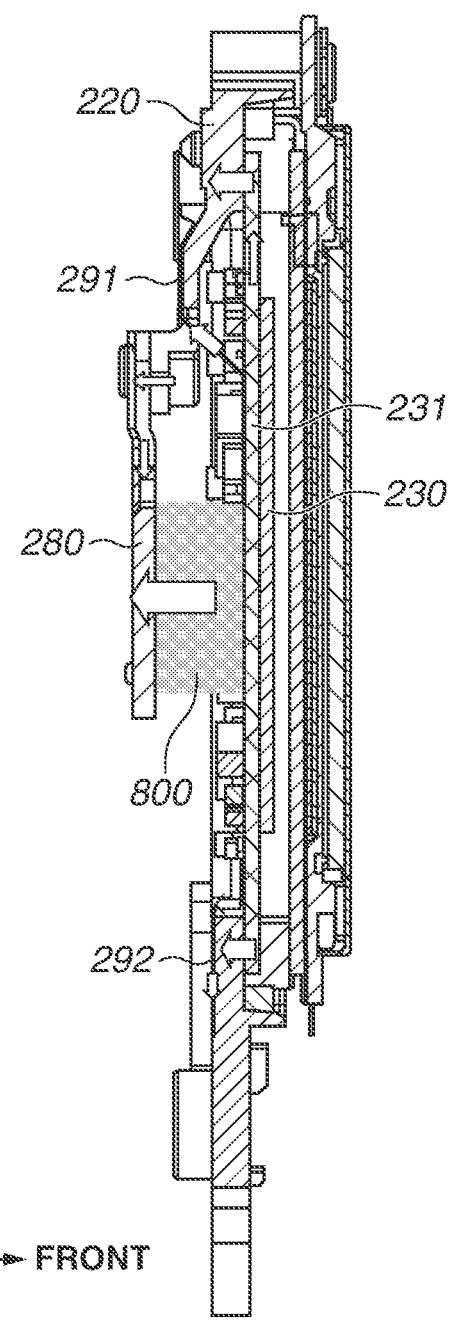
FIG. 9B is a cross-sectional view taken along a line B-B (in FIG. 9A).

FIG. 9B is a cross-sectional view taken along a line B-B (in FIG. 9A).

As illustrated in FIG. 9A, in the movable unit 200a, sheet-like heat dissipation members with high heat conductivity, such as graphite sheets, thermally connecting the image sensor substrate 231 and the movable frame 220 are disposed.

More specifically, on an upper end side of the movable unit 200a, an upper heat transfer member 291 is disposed. On a lower end side of the movable unit 200a, a lower heat transfer member 292 is disposed.

The upper heat transfer member 291 and the lower heat transfer member 292 are aimed at reducing the thermal resistance of the image sensor substrate 231 and the movable frame 220.

An integrated heat transfer member that entirely covers the image sensor substrate 231 may be formed and connected to the movable frame 220.

In the movable unit 200a, a thickness direction heat transfer member 800 that connects between the image sensor substrate 231 and the heat transfer function holding member 280 to transfer heat therebetween is also disposed.

As the thickness direction heat transfer member 800, a sheet-like molded member that uses silicon as a base material, has low hardness (Asker-C 0), is capable of transferring the heat in the thickness direction, and has relatively high heat conductivity (3 W/m·K) is suitable.

With the low hardness, the thickness direction heat transfer member 800 can be deformed along an outer shape of an electronic component mounted on the image sensor substrate 231. Thus, it is possible to increase the contact area by an amount corresponding to the deformation and enhance the heat dissipation effect.

As illustrated in FIG. 9B, it is possible to reduce the thermal resistance of a heat transfer portion of the image sensor 230 and the movable frame 220 by using the upper heat transfer member 291 and the lower heat transfer member 292 as compared to the configuration according to the first exemplary embodiment.

In addition, by using the thickness direction heat transfer member 800, it is possible to add a thermal path directly connecting between the image sensor substrate 231 and the heat transfer function holding member 280.

As a result, the amount of heat transferred from the image sensor 230 to the heat transfer function holding member 280 increases, and the effect of dissipating the heat to the fixed unit 200b side is enhanced by using the heat transfer members (the upper and lower heat transfer members 291 and 292 and the thickness direction heat transfer member 800).

With the above configuration, it is possible to provide an electronic apparatus capable of dissipating the heat of an image sensor while suppressing a load increase in displacement of a movable member.

A summary of the present exemplary embodiment will be illustrated.

The upper and lower heat transfer members (the first heat transfer sheets) 291 and 292 connecting between the movable frame 220 of the movable unit (the movable member) 200a to which the image sensor substrate (the imaging substrate) 231 is fixed and the image sensor substrate (the imaging substrate) 231 are further included.

The thickness direction heat transfer member (the second heat transfer sheet) 800 capable of transferring the heat in the thickness direction is further included between the heat transfer function holding member (the metal plate) 280 and the image sensor substrate (the imaging substrate) 231.

In a fourth exemplary embodiment, a configuration in which a heat transfer member 293 connecting the fixed unit 200b and the movable unit 200a extends in the same direction as the flexible substrate 270, and does not overlap the flexible substrate 270 will be described.

Components similar to those in the first exemplary embodiment are designated by the same reference numerals, and redundant descriptions thereof will be omitted.

Figure 10A:
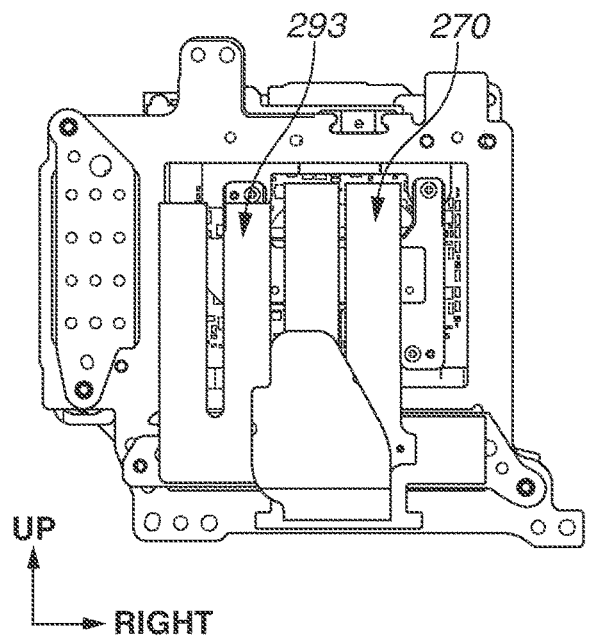
FIG. 10A is a rear view of an image blur correction unit according to a fourth exemplary embodiment.

FIG. 10A is a rear view of the image blur correction unit 200 including the flexible substrate 270 and the heat transfer member 293 according to the present exemplary embodiment.

Figure 10B:
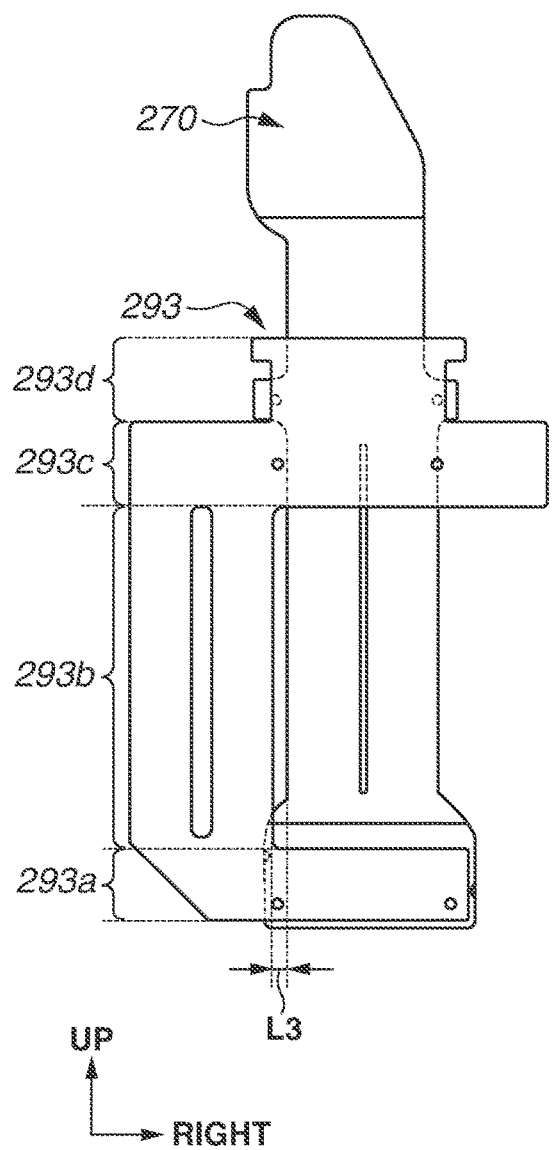
FIG. 10B is a front view of a flexible substrate and a heat transfer member according to the fourth exemplary embodiment in an unfolded state.

FIG. 10B is a front view of the flexible substrate 270 and the heat transfer member 293 according to the present exemplary embodiment in an unfolded state.

Figure 10C:
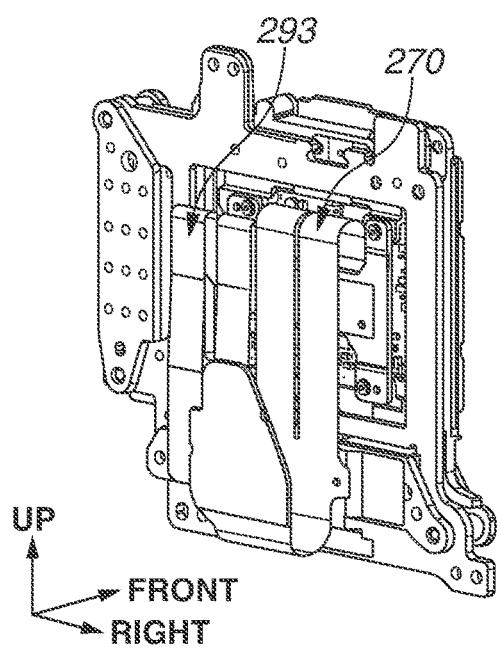
FIG. 10C is a rear perspective view of the image blur correction unit according to the fourth exemplary embodiment.

FIG. 10C is a rear perspective view of the image blur correction unit 200 including the flexible substrate 270 and the heat transfer member 293 according to the present exemplary embodiment.

As illustrated in FIG. 10B, the present exemplary embodiment is different from the first exemplary embodiment in the shape of the heat transfer member connecting the fixed unit 200b and the movable unit 200a.

The heat transfer member 293 according to the present exemplary embodiment is formed of four main areas.

The heat transfer member 293 includes a heat transfer holding member sticking portion 293a, a heat transfer member non-fixed portion 293b, a back yoke fixing portion 293c, and a base plate fixing portion 293d in order from the movable unit 200a side in a heat transfer direction that is the longitudinal direction of the heat transfer member 293.

The heat transfer member 293 is formed of a sheet member, such as a graphite sheet, having flexibility with a thickness of about 0.1 mm, and double-sided tape (not illustrated) is disposed in each of the back yoke fixing portion 293c and the base plate fixing portion 293d.

The heat transfer member 293 has a shape in which the heat transfer member 293 extends in the same direction as the flexible substrate 270 and is separated by a predetermined clearance L3 from the flexible substrate 270 in the heat transfer member non-fixed portion 293b so that the heat transfer member 293 and the flexible substrate 270 do not overlap each other.

The predetermined clearance L3 is a clearance in the left-right direction between the flexible substrate 270 and the heat transfer member 293 that is greater than or equal to a maximum movable amount of the translational movement of the movable unit 200a in the left-right direction.

Accordingly, it is possible to avoid a situation where the flexible substrate 270 and the heat transfer member 293 interfere with each other and a load increase occurs in image blur correction.

With the above configuration, it is possible to provide an electronic apparatus capable of dissipating the heat of an image sensor while suppressing a load increase in displacement of a movable member.

A summary of the present exemplary embodiment will be described.

The movable unit (the movable member) 200a including the image sensor 230 can be displaced in the direction orthogonal to the optical axis P.

The fixed unit (the supporting member) 200b supports the movable unit (the movable member) 200a in a movable manner.

The control substrate 100 controls the movable unit (the movable member) 200a.

The flexible substrate (the wiring substrate) 270 has flexibility for electrically connecting the movable unit (the movable member) 200a and the control substrate 100.

The heat transfer member 293 has flexibility for thermally connecting the movable unit (the movable member) 200a and the fixed unit (the supporting member) 200b with heat conductivity higher than heat conductivity of the flexible substrate (the wiring substrate) 270, on a second surface side being an opposite side of a first surface of the image sensor substrate (the imaging substrate) 231 on which the image sensor 230 is mounted.

The flexible substrate (the wiring substrate) 270 includes the first connection portion (the first electric connection portion) 270a electrically connected to the image sensor substrate (the imaging substrate) 231, and the second connection portion (the second electric connection portion) 270c electrically connected to the control substrate 100.

The flexible substrate (the wiring substrate) 270 also includes the first wiring portion (the wiring portion) 270b extending from the first connection portion (the first electric connection portion) 270a to the second connection portion (the second electric connection portion) 270c and including one or more bending portions.

The heat transfer member 293 includes the heat transfer holding member sticking portion (the first heat fixing portion) 293a thermally connected to the image sensor substrate (the imaging substrate) 231, and the back yoke fixing portion (the second heat fixing portion) 293c thermally connected to the fixed unit (the supporting member) 200b.

The heat transfer member 293 also includes the heat transfer member non-fixed portion (the heat connection portion) 293b extending from the heat transfer holding member sticking portion (the first heat fixing portion) 293a to the back yoke fixing portion (the second heat fixing portion) 293c and including one or more bending portions.

The heat transfer member non-fixed portion (the heat connection portion) 293b extending from the heat transfer holding member sticking portion (the first heat fixing portion) 293a of the heat transfer member 293 extends in the same direction as the first wiring portion (the wiring portion) 270b extending from the first connection portion (the first electric connection portion) 270a of the flexible substrate (the wiring substrate) 270.

When viewed from the second surface side, the heat transfer member 293 does not overlap the flexible substrate (the wiring substrate) 270 in a portion other than the first connection portion (the first electric connection portion) 270a and the second connection portion (the second electric connection portion) 270c.

In a fifth exemplary embodiment, a configuration in which a heat transfer member 294 connecting the fixed unit 200b and the movable unit 200a extends in a direction different from the flexible substrate 270, and does not overlap the flexible substrate 270 will be described.

Components similar to those in the first exemplary embodiment are designated by the same reference numerals, and redundant descriptions thereof will be omitted.

Figure 11A:
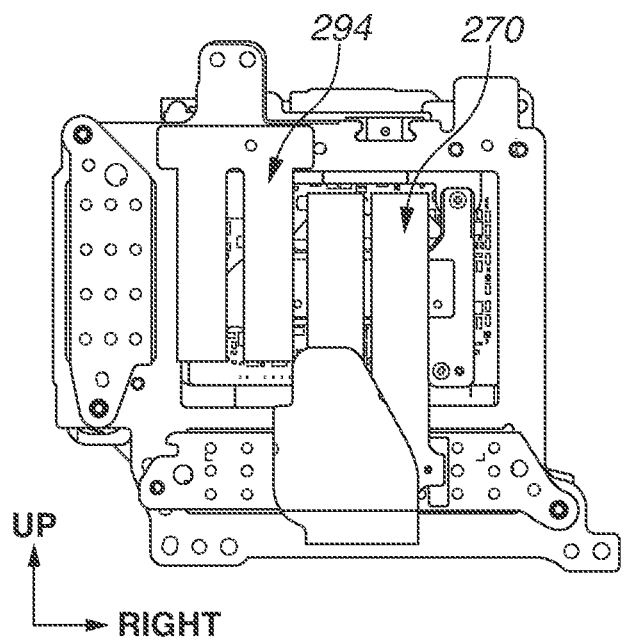
FIG. 11A is a rear view of an image blur correction unit according to a fifth exemplary embodiment.

FIG. 11A is a rear view of the image blur correction unit 200 including the flexible substrate 270 and a heat transfer member 294 according to the present exemplary embodiment.

Figure 11B:
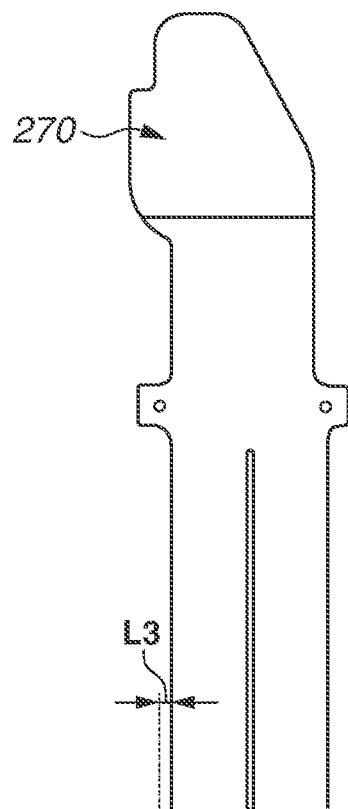
FIG. 11B is a front view of a flexible substrate and a heat transfer member according to the fifth exemplary embodiment in an unfolded state.

FIG. 11B is a front view of the flexible substrate 270 and the heat transfer member 294 according to the present exemplary embodiment in an unfolded state.

Figure 11C:
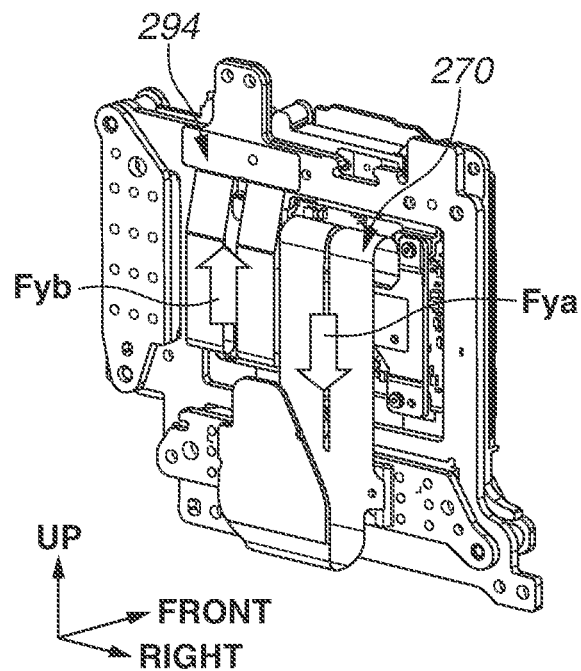
FIG. 11C is a rear perspective view of the image blur correction unit according to the fifth exemplary embodiment.

FIG. 11C is a rear perspective view of the image blur correction unit 200 including the flexible substrate 270 and the heat transfer member 294 according to the present exemplary embodiment.

As illustrated in FIG. 11B, the present exemplary embodiment is different from the first exemplary embodiment in the shape of the heat transfer member connecting the fixed unit 200b and the movable unit 200a.

The heat transfer member 294 according to the present exemplary embodiment is formed of three main areas.

The heat transfer member 294 includes a heat transfer holding member sticking portion 294a, a heat transfer member non-fixed portion 294b, and a base plate fixing portion 294c in order from the movable unit 200a side in a heat transfer direction that is the longitudinal direction of the heat transfer member 294.

The heat transfer member 294 is formed of a sheet member, such as a graphite sheet, having flexibility with a thickness of about 0.1 mm, and double-sided tape (not illustrated) is disposed in the base plate fixing portion 294c.

The heat transfer member 294 has a shape in which the heat transfer member 294 extends in a direction different from the flexible substrate 270 (the downward direction in the present exemplary embodiment) and is separated by the predetermined clearance L3 from the flexible substrate 270 as described in the fourth exemplary embodiment in the heat transfer member non-fixed portion 294b so that the heat transfer member 294 and the flexible substrate 270 do not overlap each other.

Accordingly, it is possible to avoid the situation where the flexible substrate 270 and the heat transfer member 294 interfere with each other and a load increase occurs in image blur correction.

It is assumed that a reaction force of the flexible substrate 270 generated when the movable unit 200a is moved in the up-down direction during image blur correction is Fya, and a reaction force of the heat transfer member 294 generated at this time is Fyb.

A configuration is employed in which a width W4 of the heat transfer member non-fixed portion 294b of the heat transfer member 294 is adjusted at this time to satisfy the relation of Fya=Fyb.

Magnitudes of the reaction forces Fya and Fyb are made approximately equal to each other, so that it is possible to balance a load in the up-down direction.

Thus, in the flexible substrate 270 and the heat transfer member non-fixed portion 294b, a load is practically generated in the left-right direction. Accordingly, driving control is performed in the left-right direction. This simplifies control and contributes to a reduction in power consumption.

With the above configuration, it is possible to provide an electronic apparatus capable of dissipating the heat of an image sensor while suppressing a load increase in displacement of a movable member.

A summary of the present exemplary embodiment will be described.

The movable unit (the movable member) 200a including the image sensor 230 can be displaced in the direction orthogonal to the optical axis P.

The fixed unit (the supporting member) 200b supports the movable unit (the movable member) 200a in a movable manner.

The control substrate 100 controls the movable unit (the movable member) 200a.

The flexible substrate (the wiring substrate) 270 has flexibility for electrically connecting the movable unit (the movable member) 200a and the control substrate 100.

The heat transfer member 294 has flexibility for thermally connecting the movable unit (the movable member) 200a and the fixed unit (the supporting member) 200b with heat conductivity higher than heat conductivity of the flexible substrate 8 (the wiring substrate) 270, on a second surface side being an opposite side of a first surface of the image sensor substrate (the imaging substrate) 231 on which the image sensor 230 is mounted.

The flexible substrate (the wiring substrate) 270 includes the first connection portion (the first electric connection portion) 270a electrically connected to the image sensor substrate (the imaging substrate) 231 and the second connection portion (the second electric connection portion) 270c electrically connected to the control substrate 100.

The flexible substrate (the wiring substrate) 270 also includes the first wiring portion (the wiring portion) 270b extending from the first connection portion (the first electric connection portion) 270a to the second connection portion (the second electric connection portion) 270c and including one or more bending portions.

The heat transfer member 294 includes the heat transfer holding member sticking portion (the first heat fixing portion) 294a thermally connected to the image sensor substrate (the imaging substrate) 231 and the base plate fixing portion (the second heat fixing portion) 294c thermally connected to the fixed unit (the supporting member) 200b.

The heat transfer member 294 also includes the heat transfer member non-fixed portion (the heat connection portion) 294b extending from the heat transfer holding member sticking portion (the first heat fixing portion) 294a to the base plate fixing portion (the second heat fixing portion) 294c and including one or more bending portions.

The heat transfer member non-fixed portion (the heat connection portion) 294b extending from the heat transfer holding member sticking portion (the first heat fixing portion) 294a of the heat transfer member 294 extends in the direction different from the first wiring portion (the wiring portion) 270b extending from the first connection portion (the first electric connection portion) 270a of the flexible substrate (the wiring substrate) 270.

When viewed from the second surface side, the first connection portion (the first electric connection portion) 270a and the heat transfer holding member sticking portion (the first heat fixing portion) 294a overlap each other, and the second connection portion (the second electric connection portion) 270c and the base plate fixing portion (the second heat fixing portion) 294c overlap each other.

When viewed from the second surface side, the heat transfer member non-fixed portion (the heat connection portion) 294b of the heat transfer member 294 does not overlap the first wiring portion (the wiring portion) 270b of the flexible substrate (the wiring substrate) 270 in a portion other than the first connection portion (the first electric connection portion) 270a and the second connection portion (the second electric connection portion) 270c.

While the exemplary embodiments of the present disclosure have been described above, the present disclosure is not limited to the exemplary embodiments, and the exemplary embodiments can be modified and changed in various ways within the scope of the present disclosure. Parts of the exemplary embodiments may be appropriately combined together.

According to the exemplary embodiments of the present disclosure, it is possible to provide an imaging apparatus capable of dissipating the heat of an image sensor while suppressing a load increase in displacement of a movable member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-067634, filed Apr. 13, 2021, which is hereby incorporated by reference herein in its entirety.

What is claimed is:

1. An imaging apparatus comprising:
a movable member including an image sensor and configured to be displaced in a direction orthogonal to an optical axis;
a supporting member supporting the movable member in a movable manner;
a control substrate configured to control the movable member;
a wiring substrate having flexibility for electrically connecting the movable member and the control substrate; and
a heat transfer member having flexibility for thermally connecting the movable member and the supporting member with heat conductivity higher than heat conductivity of the wiring substrate, on a second surface side that is a side opposite of a first surface of an imaging substrate on which the image sensor is mounted,
wherein the wiring substrate includes a first electric connection portion electrically connected to the imaging substrate, a second electric connection portion electrically connected to the control substrate, and a wiring portion extending from the first electric connection portion to the second electric connection portion and including one or more bending portions,
wherein the heat transfer member includes a first heat fixing portion thermally connected to the imaging substrate, a second heat fixing portion thermally connected to the supporting member, and a heat connection portion extending from the first heat fixing portion to the second heat fixing portion and including one or more bending portions,
wherein the heat connection portion extending from the first heat fixing portion of the heat transfer member extends in the same direction as the wiring portion extending from the first electric connection portion of the wiring substrate, and
wherein, when viewed from the second surface side, the heat transfer member at least partially overlaps the wiring substrate in a portion different from an area where each of the first electric connection portion and the second electric connection portion is located.

2. The imaging apparatus according to claim 1, further comprising a separation member between the heat transfer member and the wiring substrate in the portion different from the area where each of the first electric connection portion and the second electric connection portion is located.

3. The imaging apparatus according to claim 1, wherein a length of the heat connection portion of the heat transfer member is shorter than a length of the wiring portion of the wiring substrate.

4. The imaging apparatus according to claim 1, wherein, when viewed from the second surface side, the first electric connection portion and the first heat fixing portion overlap each other, the second electric connection portion and the second heat fixing portion overlap each other, and the wiring portion and the heat connection portion overlap each other.

5. The imaging apparatus according to claim 1,
wherein the heat connection portion of the heat transfer member includes one or more slit portions, and
wherein the heat connection portion of the heat transfer member has a symmetrical shape in a direction orthogonal to the direction in which the heat connection portion extends.

6. The imaging apparatus according to claim 1, further comprising a battery chamber via a base plate at a position where the heat transfer member is fixed to the supporting member.

7. The imaging apparatus according to claim 1, further comprising a first heat transfer sheet connecting between a movable frame, in the movable member, to which the imaging substrate is fixed and the imaging substrate.

8. The imaging apparatus according to claim 1, wherein the movable member includes, on the second surface side, a metal plate to which the heat transfer member is fixable on an electric component mounted on the imaging substrate.

9. The imaging apparatus according to claim 8, further comprising a second heat transfer sheet that is disposed between the metal plate and the imaging substrate and is configured to transfer heat in a thickness direction.

10. An imaging apparatus comprising:
a movable member including an image sensor and configured to be displaced in a direction orthogonal to an optical axis;
a supporting member supporting the movable member in a movable manner;
a control substrate configured to control the movable member;
a wiring substrate having flexibility for electrically connecting the movable member and the control substrate; and
a heat transfer member having flexibility for thermally connecting the movable member and the supporting member with heat conductivity higher than heat conductivity of the wiring substrate, on a second surface side that is a side opposite of a first surface of an imaging substrate on which the image sensor is mounted, wherein the wiring substrate includes a first electric connection portion electrically connected to the imaging substrate, a second electric connection portion electrically connected to the control substrate, and a wiring portion extending from the first electric connection portion to the second electric connection portion and including one or more bending portions, wherein the heat transfer member includes a first heat fixing portion thermally connected to the imaging substrate, a second heat fixing portion thermally connected to the supporting member, and a heat connection portion extending from the first heat fixing portion to the second heat fixing portion and including one or more bending portions, wherein the heat connection portion extending from the first heat fixing portion of the heat transfer member extends in the same direction as the wiring portion extending from the first electric connection portion of the wiring substrate, and wherein, when viewed from the second surface side, the heat transfer member does not overlap the wiring substrate in a portion different from an area where each of the first electric connection portion and the second electric connection portion is located.

11. An imaging apparatus comprising:
a movable member including an image sensor and configured to be displaced in a direction orthogonal to an optical axis;
a supporting member supporting the movable member in a movable manner;
a control substrate configured to control the movable member;
a wiring substrate having flexibility for electrically connecting the movable member and the control substrate; and
a heat transfer member having flexibility for thermally connecting the movable member and the supporting member with heat conductivity higher than heat conductivity of the wiring substrate, on a second surface side that is a side opposite of a first surface of an imaging substrate on which the image sensor is mounted, wherein the wiring substrate includes a first electric connection portion electrically connected to the imaging substrate, a second electric connection portion electrically connected to the control substrate, and a wiring portion extending from the first electric connection portion to the second electric connection portion and including one or more bending portions, wherein the heat transfer member includes a first heat fixing portion thermally connected to the imaging substrate, a second heat fixing portion thermally connected to the supporting member, and a heat connection portion extending from the first heat fixing portion to the second heat fixing portion and including one or more bending portions, wherein the heat connection portion extending from the first heat fixing portion of the heat transfer member extends in a direction different from the wiring portion extending from the first electric connection portion of the wiring substrate, wherein when viewed from the second surface side, the first electric connection portion and the first heat fixing portion overlap each other, and wherein when viewed from the second surface side, the heat connection portion of the heat transfer member does not overlap the wiring portion of the wiring substrate in a portion different from an area where the first electric connection portion is located.

* * * * *